United States Patent [19]

DeBriae et al.

[11] Patent Number: 5,758,681
[45] Date of Patent: Jun. 2, 1998

[54] FLUID CYLINDER PRESSURE CHECK VALVE DEVICE

[75] Inventors: Thomas Edward DeBriae, Orchard Park; John Notaro, West Seneca; Raymond Stephen Sigeti, Cheektowaga, all of N.Y.

[73] Assignee: Praxair Technology, Inc., Danbury, Conn.

[21] Appl. No.: 573,088

[22] Filed: Dec. 15, 1995

[51] Int. Cl.⁶ ............................................. F16K 15/18
[52] U.S. Cl. ........................ 137/15; 137/460; 137/522; 251/83
[58] Field of Search .................... 137/614.2, 459, 137/460, 522; 251/83, 263, 331, 82

[56] References Cited

U.S. PATENT DOCUMENTS

| | | | |
|---|---|---|---|
| 748,091 | 12/1903 | Nethery | 251/83 |
| 2,634,748 | 4/1953 | Morrison | 251/263 |
| 2,861,569 | 11/1958 | Emerson | 251/83 |
| 2,926,690 | 3/1960 | Martin | 137/460 |
| 3,292,895 | 12/1966 | Leger et al. | 251/83 |
| 3,408,040 | 10/1968 | Kraft | 251/263 |
| 3,656,709 | 4/1972 | Shufflebarger et al. | 251/263 |
| 3,981,328 | 9/1976 | Yonezawa | 251/83 |
| 3,987,812 | 10/1976 | Nelson | 251/83 |
| 4,448,391 | 5/1984 | Young | 251/263 |
| 4,535,802 | 8/1985 | Robertson | 251/263 |
| 4,580,596 | 4/1986 | Stehling | 251/83 |
| 4,700,735 | 10/1987 | Hamernik | 251/263 |
| 4,844,111 | 7/1989 | Pritchard et al. | 137/71 |
| 4,905,723 | 3/1990 | Pritchard et al. | 137/71 |
| 4,909,269 | 3/1990 | Pritchard et al. | 137/71 |
| 5,174,497 | 12/1992 | White | 236/102 |
| 5,305,794 | 4/1994 | George | 137/614.2 |
| 5,373,873 | 12/1994 | Miller et al. | 141/18 |
| 5,398,725 | 3/1995 | Nakazawa et al. | 251/263 |

*Primary Examiner*—George L. Walton
*Attorney, Agent, or Firm*—Stanley Ktorides

[57] ABSTRACT

The present invention relates to a fluid cylinder pressure check valve device, for use during the recharging of cylinders with fluid(s). In use, the invention is attached to a valve assembly of the cylinder so that when the valve assembly is opened, residual pressure within the cylinder may be determined to enable more efficient recharging. The invention also allows cylinders containing gas mixtures to be recharged to attain enhanced composition uniformity.

6 Claims, 7 Drawing Sheets

5,758,681

1

FLUID CYLINDER PRESSURE CHECK VALVE DEVICE

FIELD OF THE INVENTION

The present invention relates to fluid cylinder pressure check valve devices, and more particularly to fluid cylinder pressure check valve devices for use during the recharging of cylinders with fluid(s). In use, the fluid cylinder pressure check valve devices of the present invention are attached to a valve assembly of a used fluid cylinder returned for recharging so that when the valve assembly is opened, the amount, if any, of residual pressure contained within the cylinder may be determined. If the residual pressure is equal to or greater than a certain preset pressure, the cylinder may be "topped off" with product fluid. If the residual pressure is less than the preset pressure or has been exhausted to atmospheric pressure, the cylinder may be vented ("blown down"), evacuated and then recharged (or evacuated and then recharged) with product fluid. The present invention also allows cylinders containing gas mixtures to be recharged so as to attain enhanced composition uniformity.

BACKGROUND OF THE INVENTION

High pressure cylinders are used widely to transport and dispense large quantities of various industrial gases. Such cylinders can be used individually or manifolded to supply the user's gas requirements. Often when the gas use requirements have ceased and particularly when the gas supply is exhausted, the cylinders are sent for refilling or recharging.

When high pressure gas cylinders are returned for recharging, they may be returned empty or they may be returned containing gas under a residual pressure. The residual pressure is ordinarily greater than the use pressure and may range up to nearly full cylinder pressure, e.g. about 2200 psig, depending on the gas.

Presently, when such cylinders are returned for recharging, they are connected through a manifold to a filling rack, the cylinder valves on all of the cylinders are opened and the contents of the cylinders are vented to atmospheric pressure (or "blown down"). Those vented cylinders are then evacuated under reduced pressure. Once evacuated, the cylinders may be recharged. This practice, though common, is inherently inefficient as product gas is wasted when cylinders having high residual pressure are vented. In addition, processing time for recharging returned cylinders is lengthy since all returned cylinders are vented and evacuated. Such cylinder evacuation is necessary using this common practice to minimize the opportunity for product gas contamination.

Attempts have been made during the recharging operation to identify cylinders which contain residual pressure. When identified, such cylinders are indicated for recharging separately. By so doing, the loss of product gas is minimized because only those cylinders having low residual pressure are vented; however, this identification practice is labor intensive and requires operator or handler judgment when evaluating whether used cylinders contain residual pressure.

Cylinders containing gas mixtures are recharged to varying degrees of composition uniformity if topped off from varying residual pressure levels.

High pressure cylinders have valve assemblies which often include pressure check systems. These pressure check systems are designed to ensure that a residual pressure at a specified pressure always exists in the cylinders returned for recharging. The pressure check system containing valve assemblies are mechanically complex and add expense to the gas cylinder package. Moreover, these valve assemblies require adapters for use with the cylinder recharging lead during the recharging operation.

Certain known cylinder valve assemblies with pressure check systems include a pressure retention back check valve having a check valve spool. The check valve spool is designed to retain within a cylinder a residual pressure using a tension-loaded spring which is gauged to a preset pressure. When the residual pressure within the cylinder is higher than the preset pressure, a force unbalance exists on the opposing faces of the check valve spool. The force unbalance causes the check valve spool to be maintained in an open position. In the open position, fluid delivery around the spool is permitted when a source of fluid is introduced through the valve assembly at a pressure higher than the preset pressure.

When the check valve spool is in a closed position, residual pressure within the cylinder is retained. A bleed channel, which connects the opposite faces of the check valve spool, prevents the introduction of gas into the cylinder from a higher pressure source. By applying the external pressure on the unequal faces of the check valve spool the bleed channel prevents the check valve spool from assuming the open position and thereby creates an unbalanced closing force. However, in order to charge the cylinder, an adapter is required for holding the check valve spool in the open position. This adapter also prevents back flow into the cylinder. Since valve assemblies of the type described above are designed to prevent back flow into the cylinder, they would require a mechanical adaptor for maintaining the check valve spool in the open position to have utility in a recharging operation. Otherwise, the valve assemblies could not be implemented in such an operation.

Also, in the event the check valve spool malfunctions, e.g. leaks within such valve assemblies resulting in a cylinder being returned for recharging with no residual pressure, the cylinder contents would not be recognized as being at atmospheric pressure unless an operator had specifically performed a vent test on that cylinder prior to its connection to the refilling rack or manifold. Thus, in a conventional recharging operation all returned cylinders are tested for residual pressure to avoid topping off an empty cylinder which could result in product fluid contamination.

Incorporation of the check valve spool into many conventional valve assemblies would also require a different, larger and complex valve body than that which is ordinarily used. Larger and more complex valves generally, as noted above, add cost to the cylinder package and also add operational steps during cylinder processing which increase cylinder handling time.

Another known device used as an excess flow check valve can also be used to check for residual pressure in a cylinder which is greater than a preset pressure. In the event the residual pressure is above that preset pressure, the cylinder may be recharged by topping off with an externally-supplied fluid. However, this device, shown in cross-sectional view in FIG. 4B, cannot be used to equalize the residual pressure of all cylinders connected to the same charging manifold and charging source.

U.S. Pat. No. 5,305,794 describes a device for controlling the rate of gas flow depending on whether the gas is flowing from the cylinder or to the cylinder. This is accomplished by the size of the orifices in the valve through which the gas flows. Gas flow is limited or restricted when it is being withdrawn from the cylinder and the check valve is opened during the filling operation to allow gas flow into the cylinder at a faster rate. Similarly, U.S. Pat. No. 5,373,873 discloses a device which includes ports of different sizes for the evacuation and filling stages of a cylinder recharging operation. A larger port is used during the evacuation stage and a smaller port is used during the refilling stage. The difference in port size allows the rate of filling to be varied depending again on whether the gas is flowing from the cylinder or to the cylinder. The devices of these two patents do not include or contemplate a residual pressure check device for sealing the flow through the cylinder valve and determining whether the residual pressure in the cylinder is above a preset pressure so that cylinder evacuation prior to refilling may be omitted. Nor do these devices include or contemplate an override feature to allow fluid passage irrespective of residual pressure.

In view of the state of the art, it would be desirable to provide a pressure check valve device for recharging fluid cylinders, which would allow a seal to be established when the fluid cylinders have a residual pressure at or above a preset pressure and also would allow passage to be maintained when the cylinders have residual pressure below the preset pressure. In addition, it would be desirable for such a device to include a mechanism for manually and conveniently overriding the seal established within the device.

OBJECTS OF THE INVENTION

It is therefore an object of the present invention to provide a pressure check valve device for recharging a fluid cylinder in which a tension-biased displaceable element seals the device when a fluid is supplied from the cylinder at a pressure equal to or greater than a preset pressure, maintains passage through the device when the fluid is supplied from the cylinder at a pressure less than the preset pressure, or seals the device when the fluid is supplied at a pressure equal to or greater than the residual pressure within the cylinder unless the fluid is supplied through the device from a source whose pressure is greater than the residual pressure within the cylinder. It is also an object of this aspect of the present invention to include a feature which allows the seal to be overridden when the fluid from within the cylinder is at a residual pressure equal to or greater than the preset pressure, and which allows the residual pressure to pass to a surrounding environment when that pressure is less than the preset pressure.

It is another object of the present invention to provide a system for recharging fluid cylinders, which includes cylinders to be recharged; a source of product fluid(s) for recharging the cylinders; pressure check valve devices for respective connection to the cylinders to be recharged; and a manifold to which is connected at its inlet position the source of product fluid(s) and to which are connected at its outlet positions each of the pressure check valve devices to which are respectively connected the cylinders to be recharged.

SUMMARY OF THE INVENTION

The present invention meets the desires and objects addressed above, and other objects which will become apparent to one skilled in the art upon a reading of this disclosure, by providing a pressure check valve device for recharging cylinders which includes a valve body adapted for fluid communication with the cylinder. The valve body itself includes a joining portion for providing fluid communication with the cylinder; a cylinder recharging portion; a valve portion disposed between the joining portion and the cylinder recharging portion; and a fluid passage control means.

The valve portion includes a channel extending through the valve body and a tension-biased displaceable element which is capable of (a) sealing the channel when a fluid at a pressure equal to or greater than the preset pressure is supplied from the cylinder to the channel, unless a fluid at a pressure greater than the residual pressure within the cylinder is supplied to the channel in the cylinder recharging portion, in which event an open fluid passage is maintained through the channel, and (b) maintain an open fluid passage through the channel when a fluid at a pressure less than the preset pressure is supplied from the cylinder to the channel in the joining portion.

The fluid passage control means may include a first position which allows fluid communication to be established between the joining portion and the cylinder recharging portion when fluid at a residual pressure equal to or greater than the preset pressure is supplied from the cylinder, and a second position which allows passage to a surrounding environment of fluid from the cylinder whose residual pressure is less than the preset pressure.

The tension-biased displaceable element may include a piston, a portion of which is capable of sealing the channel. The fluid passage control means includes means for allowing or preventing sealing movement of the tension-biased displaceable element when a fluid is supplied through the channel in the cylinder recharging portion at a pressure greater than the residual pressure within the cylinder thereby operating to permit fluid flow through the channel.

The present invention also provides a system for recharging cylinders with fluid, which includes a plurality of cylinders to be recharged; a source of product fluid(s) for recharging the plurality of cylinders; a plurality of pressure check valve devices for respective connection to the plurality of cylinders to be recharged; and a manifold to which is connected in fluid communication at its inlet position the source of product fluid(s) and to which are connected in fluid communication at its outlet positions each of the plurality of pressure check valve devices to which are respectively connected the plurality of cylinders to be recharged with fluid.

In addition, this invention provides a method of using a pressure check valve device in a cylinder recharging operation. This method includes the steps of connecting at least one pressure check valve device to at least one cylinder; determining a residual pressure within the cylinder(s); and using that determination in deciding whether to first vent and/or evacuate the cylinder(s) prior to recharging or to directly recharge the cylinder(s).

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1A:
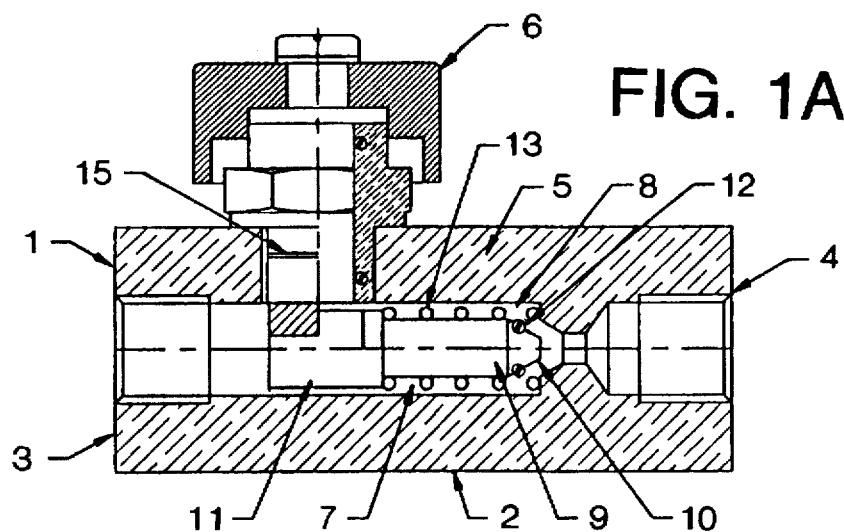
FIG. 1A depicts a pressure check valve assembly according to the present invention in an open bypass position, shown in partial cross-section.
Figure 1B:
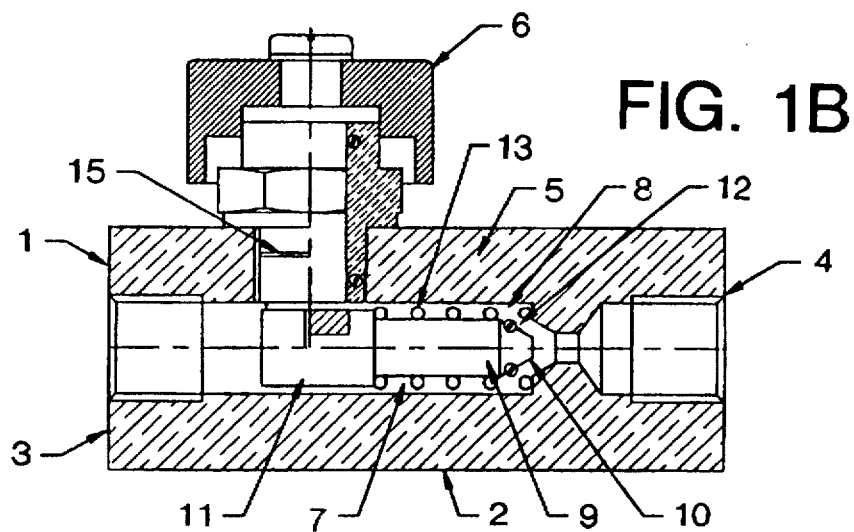
FIG. 1B depicts the pressure check valve assembly of FIG. 1A in the closed check position, shown in partial cross-section.
Figure 1C:
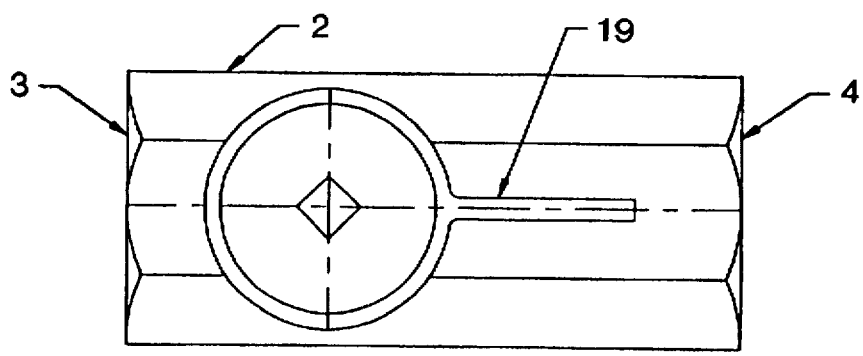
FIG. 1C depicts a top plan view of the fluid passage control means of the pressure check valve assembly of FIG. 1A and FIG. 1B.

The present invention provides a fluid cylinder check valve assembly which will be described in detail hereinafter with reference to the Figures. In the Figures common elements have the same numerals. Though the present invention may be practiced with a variety of fluids, the invention is preferably practiced with industrial gases, such as nitrogen, helium, oxygen, argon and the like, and gas mixtures, such as air and welding mixtures.

FIGS. 1A–1C, 2 and 6 illustrate a pressure check valve device according to the present invention. The pressure check valve device 1 includes a valve body 2 adapted for fluid communication with a cylinder (not shown) to which it is attached. The valve body 2 itself includes a joining portion 3 for providing fluid communication with the cylinder; a cylinder recharging portion 4; a valve portion 5 disposed between the joining portion 3 and the cylinder recharging portion 4, and a fluid passage control means 6.

The valve body 2 includes a cylindrical channel 8 bored therethrough. Within the channel 8 of the valve portion 5 is a tension-biased displaceable element 7 which is capable of sealing the channel 8. The tension-biased displaceable element 7 is adapted to seal the channel 8 when a fluid at a pressure greater than a preset pressure is supplied through the channel 8 from a cylinder attached to the joining portion 3. The tension-biased displaceable element 7 is also capable of maintaining an open fluid passage through the channel 8 when a fluid at a pressure less than the preset pressure is supplied through the channel 8 from a cylinder attached to the joining portion 3. In addition, the tension-biased displaceable element 7 is capable of sealing the channel 8 when a fluid at a pressure equal to or greater than the preset pressure is supplied through the channel 8 from a cylinder attached to the joining portion 3, unless a fluid at a pressure greater than the residual pressure within the cylinder is supplied through the channel 8 from the cylinder recharging portion 4, in which event the channel is maintained in an open position.

The tension-biased displaceable element 7 includes a piston 9, an end portion 10 of which is tapered or has a diameter or lateral dimension smaller than that of the piston 9, and is capable of sealing the channel 8 ("the sealing end of the piston"). At the other end of the piston 9 is a base 11 which has a diameter or lateral dimension slightly greater than the diameter of the piston 9. The diameter of the piston 9, and of the base 11, is smaller than that of the channel 8 to allow displaceable movement therewithin.

When biased by a residual pressure from within the cylinder equal to or greater than a preset pressure, the tension-biased displaceable element 7, more particularly the tapered or smaller diameter sealing end of the piston 10, seals the channel 8 within the valve portion 5 of the valve body 2 to prevent the escape of product gas from the cylinder.

A sealing washer 12 is provided at the sealing end of the piston 10. The sealing washer 12 allows for a tight seal to be formed within the channel 8 and prevents the flow of gas therethrough. Other sealing arrangements which may be employed in connection with the tension-biased displaceable element 7 besides the sealing washer 12 include an O-ring seal, a conical soft tip and the like.

The piston 9 is housed within the channel 8 which passes through the valve body 2. Disposed around the diameter of the piston 9 is a means for providing tension, such as a spring 13. One end of the spring 13 abuts against the end of the base 11 of the piston 9, which as noted above, has a diameter larger than that of piston 9 (though still smaller than the diameter of the channel 8). The other end of the spring 13 abuts against a landing at the distal end of channel 8, just before the tapered or reduced diameter portion of the channel 8 against which the sealing end of the piston 10 may rest.

The preset pressure is determined by the tension-loaded force exerted by the spring 13. The particular choice of a spring 13 or like tension-loaded force device will permit selection of an appropriate preset pressure. A desirable setting for this preset pressure is within the range of about 5 to about 4500 pounds per square inch gauge (psig), with about 30 to about 50 psig being preferred.

FIGS. 1A–1B, 3A–3E and 6 illustrate the fluid passage control means 6. As shown, it includes a stem body 14b having a stem 14 which extends through an opening 15 in the valve body 2 and into a slot 17 provided in the base 11 of the piston 9. The stem body 14b may be an integral part of the valve body 2, or may be connected to the opening 15 in the valve body 2 through a variety of connection means, such as threading. A primary gasket seal 12a may be placed about the stem body 14b at the point of joining the valve body 2. In addition, grommets 12b are placed around the stem 14 to seal against fluid leakage along the stem 14. The stem 14 is dimensioned such that it engages slot 17 provided in the base 11 of the piston 9. Such engagement allows for the prevention of movement of the tension-biased displaceable element 7 within the valve body 2.

The stem 14 of the fluid passage control means 6 may engage a slot 17 provided in the base 11 of the piston 9 to prevent sealing of the channel 8. Alternatively, the stem 14 may engage the slot 17 provided in the base 11 of the piston 9 to seal the channel 8 unless a fluid is supplied through the channel 8 in the cylinder recharging portion 4 at a pressure greater than the preset pressure.

More specifically, the end of the stem 14 may be cut away so that a portion, e.g. about half, of the diameter of the stem 14 remains. This cut-away portion of the stem end 14a allows the stem 14 to engage the slot 17 provided in the base 11 of the piston 9 when it is inserted through the opening 15 in the valve body 2 and into the slot 17.

The fluid passage control means 6 should include a handle or lever 19 which may be actuated to a first position 18 or a second position 20. The first position 18 or "closed check" position allows fluid communication to be established between the joining portion 3 and the cylinder recharging portion 4 when fluid at a residual pressure greater than the preset pressure is supplied from the cylinder. The second position 20 or "open bypass" position allows passage to a surrounding environment of fluid from within the cylinder. The handle 19 of the fluid passage control means 6 allows the stem end 14a to engage the slot 17 provided in the base 11 of the piston 9 to allow the fluid passage control means 6 to be in the closed check position or the open bypass position depending on which position, i.e. first position or second position, the handle 19 is placed.

Figure 2:
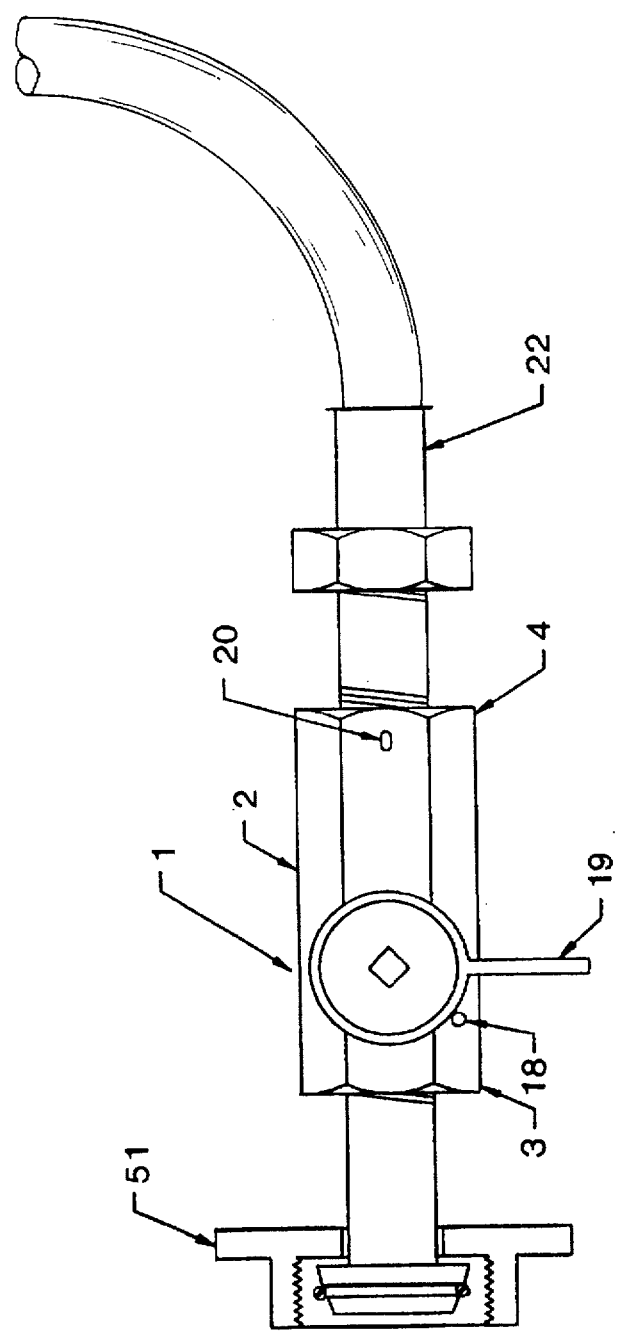
FIG. 2 depicts a pressure check valve assembly according to the present invention connected between a cylinder (not shown) and a cylinder recharging lead.
Figure 3A:
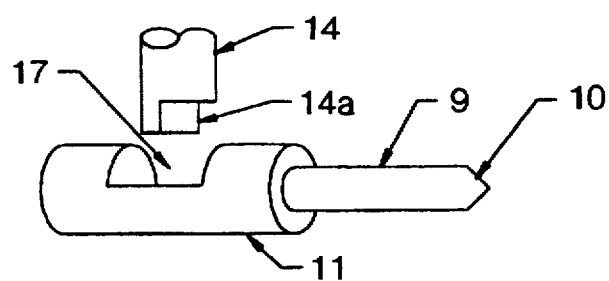
FIG. 3A depicts an exploded perspective view of the stem and the piston of an aspect of the fluid passage control means component of the pressure check valve assembly of the present invention in an open bypass position.
Figure 3B:
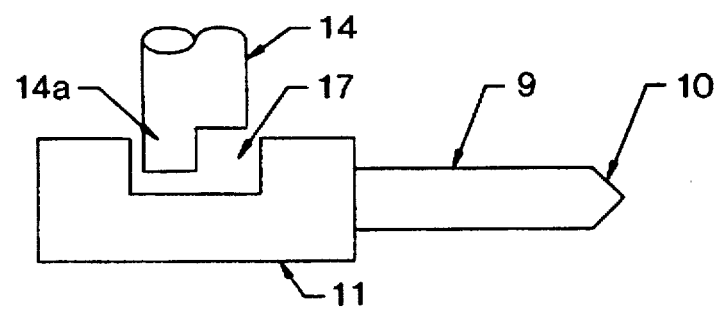
FIG. 3B depicts an exploded side view of the stem and the piston of the fluid passage control means component of the pressure check valve assembly of FIG. 3A in an open bypass position.
Figure 3C:
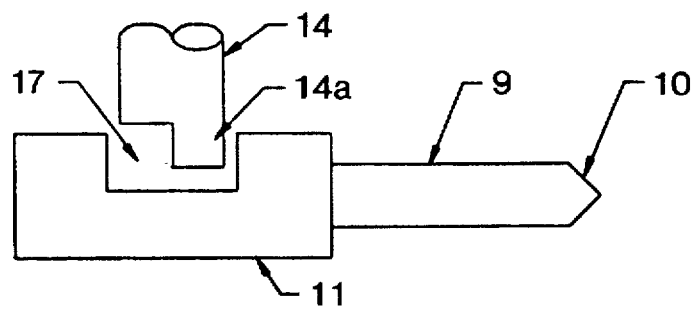
FIG. 3C depicts an exploded side view of the stem and the piston of the fluid passage control means component of the pressure check valve assembly of FIG. 3A in the closed check position.
Figure 3D:
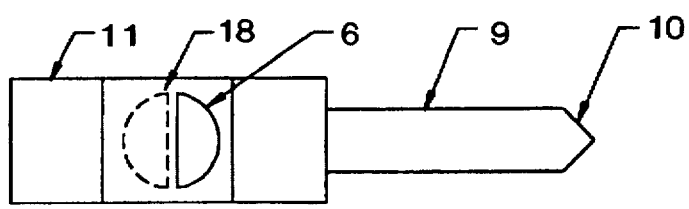
FIG. 3D depicts a top plan view of the stem and the piston of the fluid passage control means component of the pressure check valve assembly of FIG. 3A in which the stem has been rotated 180 degrees.
Figure 3E:
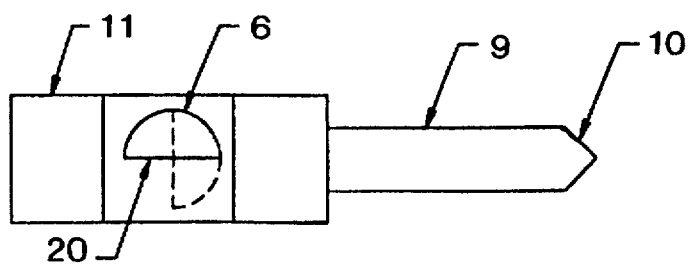
FIG. 3E depicts a top plan view of the stem and the piston of the fluid passage control means component of the pressure check valve assembly of FIG. 3A in which the stem has been rotated 90 degrees.

The valve body 2 may be constructed from a variety of materials, including bronze, monel, stainless steel and the like, and may be joined to the cylinder valve 21 (a portion of which being shown in FIG. 2) at the joining portion 3 through conventional connection mechanisms, such as complementary threading, or alternative connection means, such as those known in the art, which are well-suited to establishing the connection. The cylinder recharging portion 4 may be joined to the cylinder recharging lead 22, such as is shown in FIG. 2, by those connection mechanisms as well.

Figure 5:
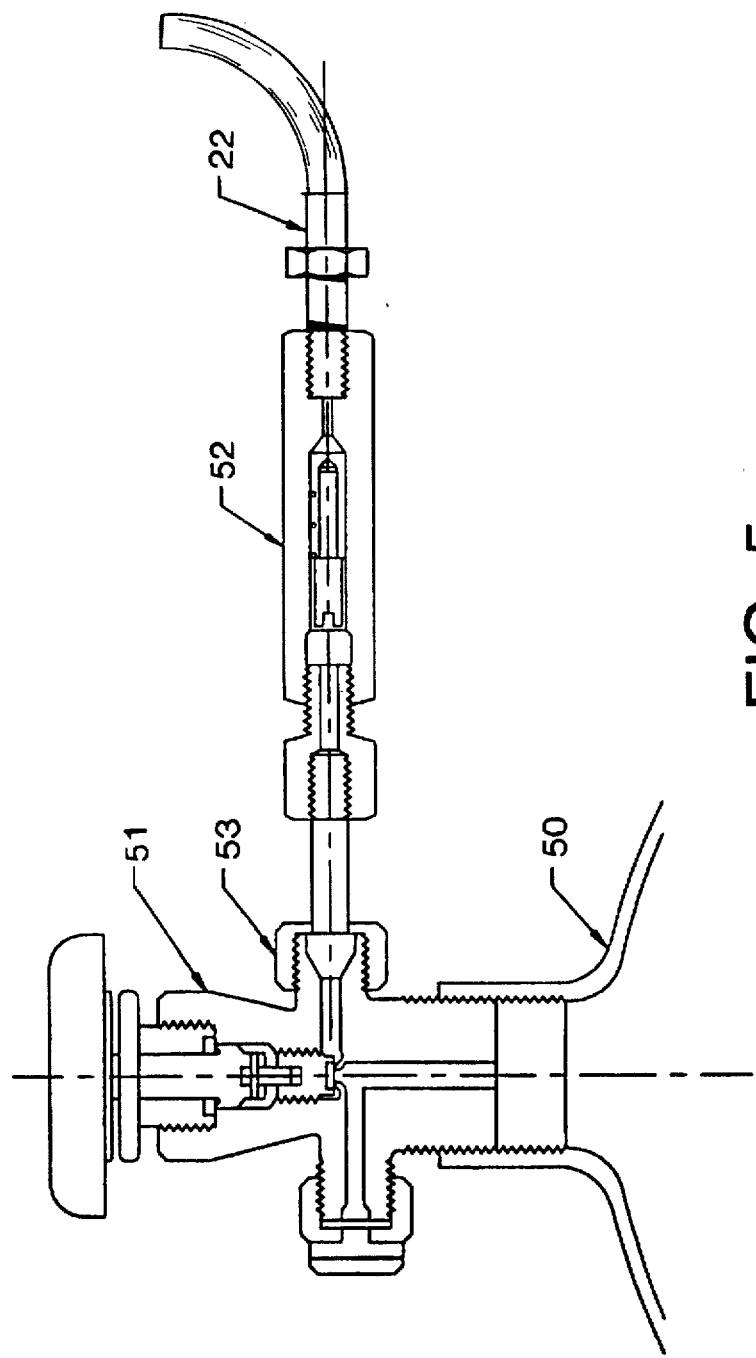
FIG. 5 depicts a side view of a prior art excess flow check valve connected between a cylinder valve and a cylinder recharging lead, shown in partial cross-section.
Figure 6:
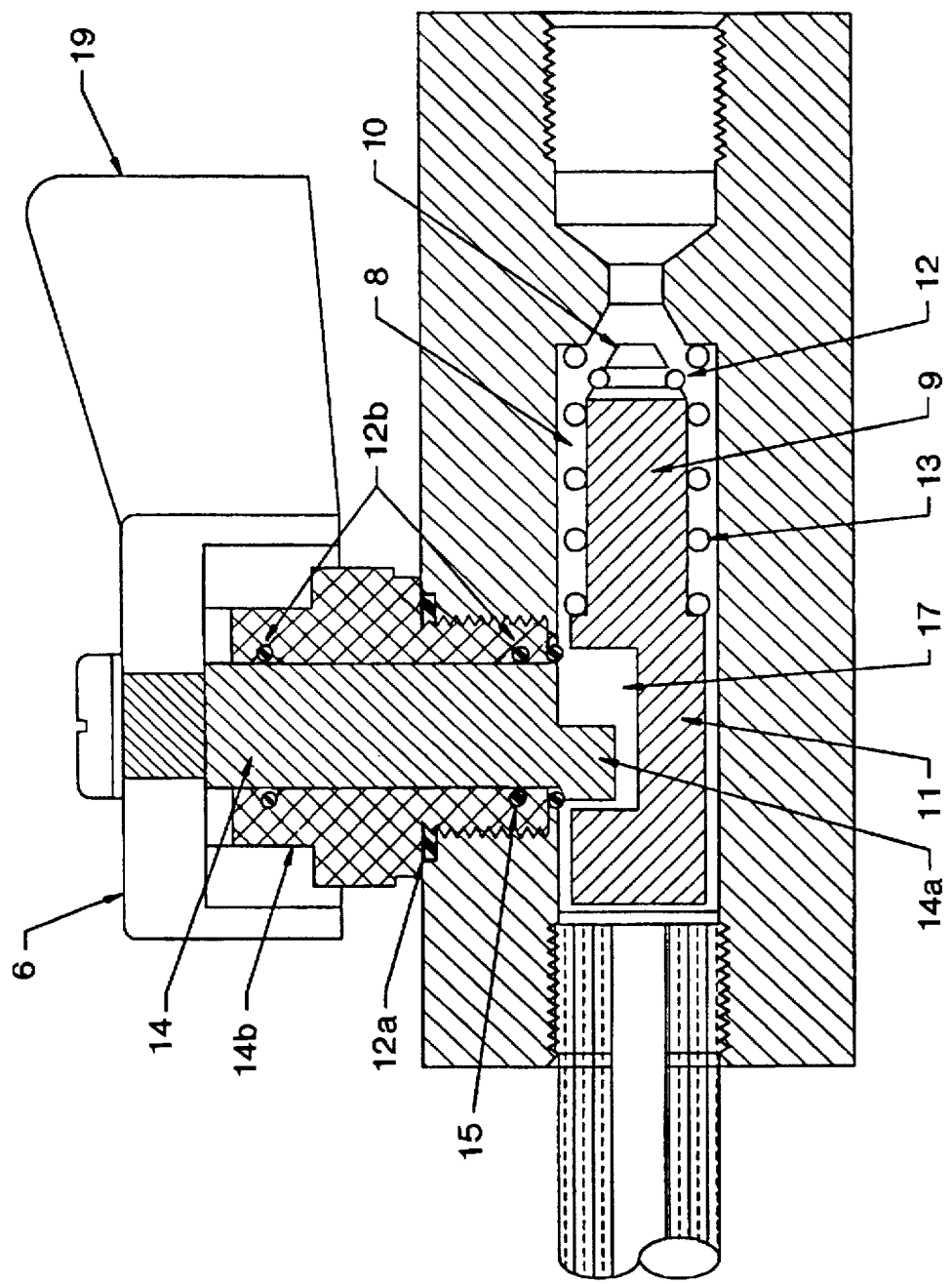
FIG. 6 depicts a pressure check valve assembly according to the present invention in an open bypass position, shown in partial cross-section.

The pressure check valve device 5 determines whether any residual pressure exists in the cylinder, i.e. a pressure which is equal to or greater than the preset pressure, when the manifold or cylinder recharging lead is connected to the cylinder and the cylinder valve is opened. FIG. 5 shows a cylinder 50 to which is inserted via threaded connection a cylinder valve assembly 51. In FIG. 5, a prior art excess flow check valve 52 is connected to the cylinder valve assembly 51 through appropriate connection means 53. A cylinder recharging lead 22 provides fluid communication with a source of product fluid (not shown) through its connection to the excess flow check valve 52 at a location thereon distal to the cylinder 50.

With reference to FIGS. 1A–1C and 3A–3E, when the pressure in the cylinder is equal to or greater than the preset pressure, the force exerted by the residual pressure from within the cylinder on the tension-loaded displaceable element 7 overcomes the force exerted by the tension-loaded spring 13. In this situation, the tension-loaded displaceable element 7 seals the channel 8 within the valve portion 5. When the pressure exerted within the manifold exceeds the pressure exerted from the cylinder contents, the resulting pressure exerted on the tension-loaded displaceable element 7 maintains an open fluid passage through the channel 8.

Alternatively, after evacuating the empty cylinders and manifold under reduced pressure, the handle 19 of the fluid passage control means 6 may be switched to the open bypass position before recharging the cylinders. By so doing, the pressure in all of the cylinders connected to the manifold may be partially vented or equalized. When thus pressure-equalized, the temperature of the cylinders is maintained substantially uniform during recharging. This allows the fluid content of the recharging cylinders to be controlled by pressure, volume and temperature measurement. Pressure equalization of the cylinders allows for a more consistent fill of the cylinders during the recharging operation because of the more accurate control of the pressure, volume and temperature measurements. In addition, use of the pressure check valve devices of the present invention is particularly advantageous in connection with the recharging of mixed gas cylinders. There, pressure equalization allows cylinders having high residual pressure to be topped off with a greater degree of uniformity of the mixed gas product composition.

If the residual pressure in the cylinders is less than the preset pressure, the pressure check valve device allows the cylinders to be blown down into the manifold and then evacuated under reduced pressure up to full vacuum, e.g. 30 inches of mercury, though preferably within the range of from about 25 to about 29 inches of mercury. The cylinders may then be recharged. Any pressure in the manifold which is higher than the preset pressure of the pressure check valve device will force fluid flow through the pressure check valve device and into the cylinder thereby recharging the cylinders or topping off their contents. With the fluid passage control means 6 of the pressure check value devices, irrespective of the residual pressure within the cylinder the override mechanism allows a passage of gas from the manifold to flow through the pressure check valve device and into the cylinder for recharging purposes.

Accordingly, installation of a pressure valve check device according to the present invention allows the following sequence of operation events to occur without operator intervention when cylinders to be recharged are connected to the manifold:

Cylinders are checked and those with a residual pressure higher than a certain preset pressure are selected for topping off.

Cylinders which are checked and determined to have a residual pressure less than a certain preset pressure are vented into the manifold and then to a surrounding environment, such as the ambient atmosphere.

Only the manifold and vented cylinders are evacuated.

All cylinders are then recharged (if checked, vented and evacuated) or topped off (if checked and indicated).

Figure 4A:
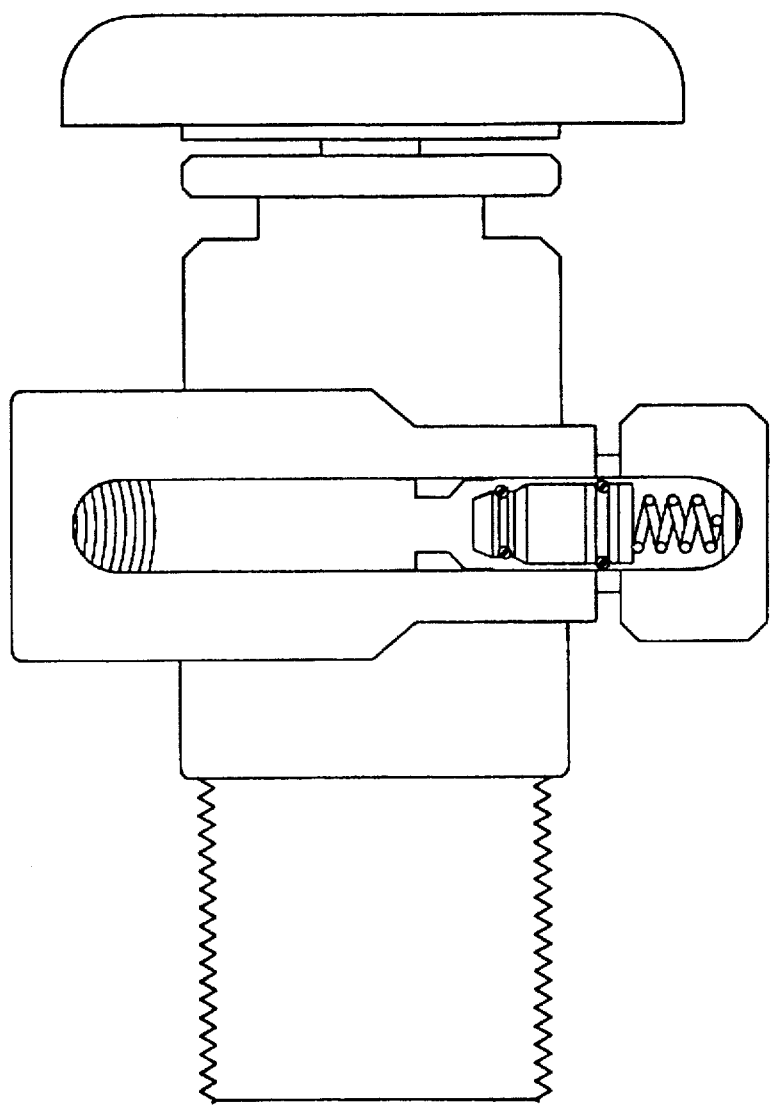
FIG. 4A depicts a side view of a prior art cylinder valve with an integral check device shown in partial cross-section.

Unlike prior art check valves, such as that illustrated in FIG. 4A, the pressure check valve devices of this invention are implemented in the cylinder recharging system without the necessity and expense of adding adapters to the check valve in order to recharge the cylinder.

Figure 4B:
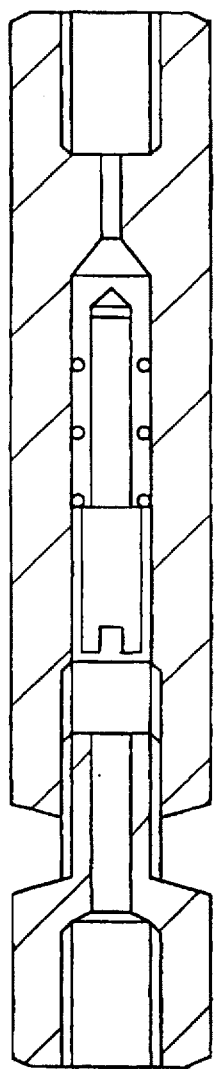
FIG. 4B depicts a side view of a prior art excess flow check valve shown in cross-section.

Pressure check valve devices in accordance with this invention, unlike the prior art excess flow check valve depicted in FIG. 4B, also have a lock-out or override feature, through implementation of the fluid passage control means 6, an open or unchecked flow path is created between the manifold to which the cylinders are connected and the cylinders. Thus, by simply setting the fluid passage control means 6 of the pressure check valve device to the second position (which is the "open bypass" position), a through flow or an unchecked path is created by overriding the tension-based displaceable element 7 within the valve portion 5. This passage so created permits cylinders to be recharged or topped off with pure product gas. The open bypass position path may also be used when recharging cylinders in the same rack or manifold with mixtures of two or more gases.

During an ordinary recharging operation of the pressure check valve devices, the handle 19 of the fluid passage control means 6 may be placed in the closed check position. In this position, the cylinders connected to the recharging manifold have been identified as containing a product residual pressure equal to or greater than the preset pressure of the pressure check valve device. Therefore, the residual pressure within the cylinder seals the pressure check valve device so that product fluid does not escape through the manifold. This results in minimizing the loss of useful product and improves the operating efficiency of the filling plant by decreasing the amount of fluid product required to recharge the cylinders.

The time involved in evacuating all cylinders on the manifold is obviated. Thus, the recharging operation should be completed in less time as fewer cylinders are likely to require a complete recharging. This reduces the total time necessary to process all the cylinders on the manifold, and increases cylinder filling output which translates into improved filling plant efficiency.

In FIG. 2, a pressure check valve device according to this invention is shown installed to the cylinder recharging lead 22 at the cylinder recharging portion 4. This installation minimizes the dead-ended volume between the cylinder valve assembly 51 (the distribution/charging end of which being shown in FIG. 2) and the pressure check valve device. The dead-ended volume is not evacuated during manifold and cylinder evacuation and must be minimized in order to preserve cylinder product fluid purity within the cylinders.

Data collected during the filling of fifty-two oxygen cylinders with a pressure check valve device in accordance with this invention connected between the recharging lead and the cylinder valves of the oxygen cylinders is summarized as follows. The residual pressure in the cylinders returned for recharging varied over a wide range. For example, twenty-four of the fifty-two cylinders returned for recharging contained a residual pressure within the range of from 50 to 2000 psig, which averages to a residual pressure of 155 psig. These cylinders, when filled to 2200 psig, correspond to a gas product savings of 7%. Since nearly 50% of the cylinders have residual pressure and do not need to be evacuated, the manifold evacuation time is correspondingly reduced by 50%.

Using the pressure check valve devices according to the present invention, gas product fluid purity is maintained irrespective of cylinder residual pressure. The oxygen purity for these cylinders was determined to be greater than 99.6%, which is comparable to the purity of the oxygen supplied to the cylinders.

The pressure check valve devices of this invention may be installed first on the cylinder valve 51 or on the cylinder recharging lead 22, which are ultimately connected to one another (such as by conventional connections 22) during a cylinder recharging operation.

The pressure check valve devices are advantageously used in connection with cylinders to be recharged which are placed on a plant rack or manifold, blown down (if required), evacuated (if required) and/or recharged. Of course, the pressure check valve devices of the present invention may also be used during the charging operation of cylinders, which have not previously been charged.

Specific features of the invention are shown in one or more of the Figures for convenience only, as each feature may be combined with other features in accordance with the invention. Alternative embodiments will be recognized by those skilled in the art and are intended to be included within the scope of the claims.

What is claimed is:

1. A pressure check valve device useful in recharging a cylinder with fluid, comprising a valve body adapted for fluid communication with said cylinder, said valve body including (a) a channel extending through said valve body;
(b) a joining portion for providing fluid communication with said cylinder;
(c) a cylinder recharging portion;
(d) a valve portion disposed between said joining portion and said cylinder recharging portion, said valve portion including a tension-biased piston having a base, which has a diameter greater than the diameter of the piston, and a spring disposed around the diameter of the piston and which abuts against the base of the piston, said piston being capable of sealing said channel and adapted to
  (i) seal said channel when a fluid at a pressure equal to or greater than a preset pressure is supplied from a cylinder through said channel in said joining portion which overcomes the spring tension, thus sealing the channel and saving the cylinder contents,
  (ii) maintain a fluid passage through said channel when a fluid at a pressure less than the preset pressure is supplied from a cylinder through said channel in said joining portion, wherein the tension spring moves and maintains the valve portion in an unseal position, so as to completely evacuate the cylinder, or
  (iii) seal said channel when a fluid at a pressure equal to or greater than the preset pressure is supplied from a cylinder through said channel in said joining portion until a fluid at a pressure greater than the residual pressure within said cylinder is supplied through said channel in said cylinder recharging portion for completely recharging the cylinder; and
(e) a fluid passage control means having a stem which extends into an opening in said valve body, said stem being dimensioned such that a portion thereof engages a surface within a slot in the base of said piston for preventing movement thereof when said stem portion is rotated within said slot and including
  (i) a first position which allows fluid communication to be established between said joining portion and said cylinder recharging portion when fluid at a residual pressure equal to or greater than the preset pressure is supplied from said cylinder when said stem portion is rotated within said slot away from said slot engaging surface, so that the residual pressure moves the piston against said stem portion for holding the piston in the unseal position for completely recharging the cylinder, and
  (ii) a second position which allows passage to a surrounding environment of fluid from said cylinder through said recharging portion whose residual pressure is less than the preset pressure, when said stem portion is rotated within said slot to a neutral position therein, thereby allowing the tension spring to move and maintain the valve portion in the unseal position to vent and equalize the pressure within said cylinder.

2. The pressure check valve device according to claim 1, wherein said stem of said fluid passage control means engages a slot in the base of said piston to maintain the sealing of said channel unless a fluid at a pressure greater than the preset pressure is supplied from a cylinder through said channel in said cylinder recharging portion.

3. The pressure check valve device according to claim 1, wherein placement of said fluid passage control means in said first position seals said channel in said valve portion.

4. The pressure check valve device according to claim 1, wherein placement of said fluid passage control means in said second position maintains an open passage through said channel in said valve portion.

5. The pressure check valve device according to claim 4, wherein placement of said fluid passage control means in said second position allows venting of fluid from said cylinder to a surrounding atmosphere.

6. A method of using the pressure check valve device of claim 1 in a cylinder recharging operation, said method comprising the steps of (a) connecting at least one pressure check valve device to at least one cylinder;

(b) determining a residual pressure within said at least one cylinder; and (c) using the determination of step (b) in deciding whether to first vent and/or evacuate said at least one cylinder prior to recharging said at least one cylinder or to directly recharge said at least one cylinder.

* * * * *